March 24, 1925. 1,530,755
V. CHUCHEL
ATTACHMENT FOR GEAR SHIFTING AND BRAKING MECHANISM
Filed Oct. 24, 1924 2 Sheets-Sheet 1
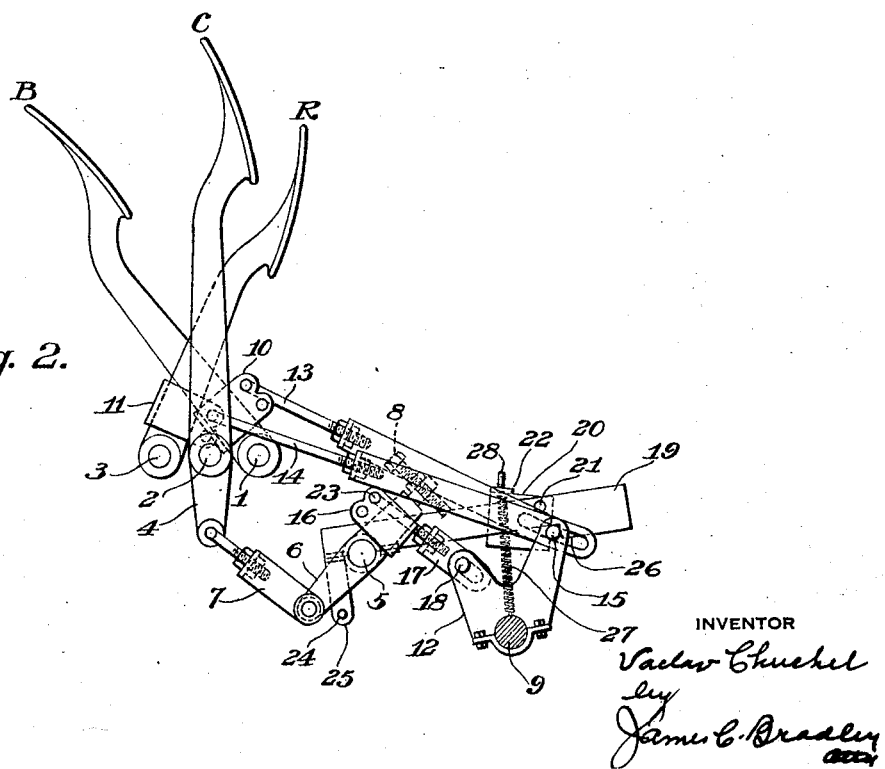
INVENTOR
Vaclav Chuchel
by
James C. Bradley March 24, 1925.  
V. CHUCHEL  
1,530,755  
ATTACHMENT FOR GEAR SHIFTING AND BRAKING MECHANISM  
Filed Oct. 24, 1924  2 Sheets-Sheet 2
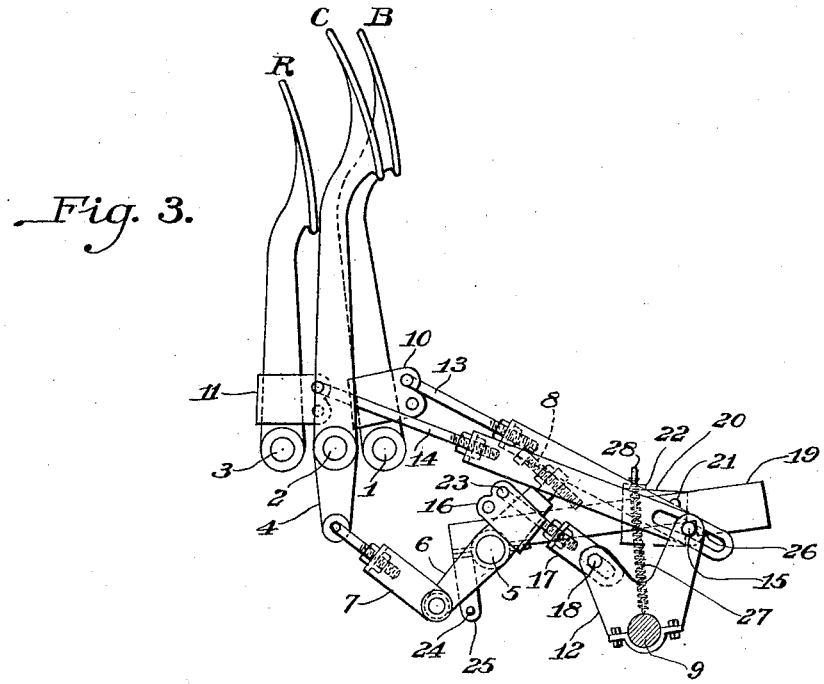
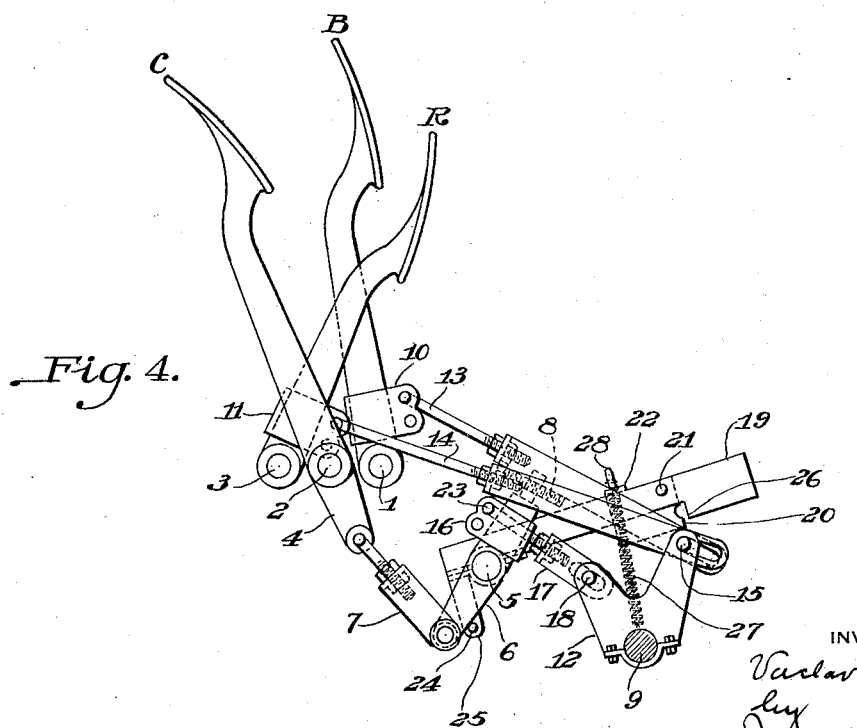
INVENTOR  
Vaclav Chuchel Patented Mar. 24, 1925.

1,530,755

UNITED STATES PATENT OFFICE.

VACLAV CHUCHEL, OF PITTSBURGH, PENNSYLVANIA.

ATTACHMENT FOR GEAR-SHIFTING AND BRAKING MECHANISM.

Application filed October 24, 1924. Serial No. 745,614.

*To all whom it may concern:*

Be it known that I, VACLAV CHUCHEL, a citizen of the United States, and a resident of Pittsburgh, in the county of Allegheny and State of Pennsylvania, have made a new and useful invention in Improvements in an Attachment for Gear-Shifting and Braking Mechanism, of which the following is a specification.

The invention relates to an attachment for use with the gear shifting and braking mechanism of an automobile, and is particularly designed for use on Ford cars, in which the service brake and the forward and reverse movements of the car are controlled by three pedals, all of which are spring held in their rear positions. These pedals are commonly referred to as the brake pedal, the reverse pedal and the clutch pedal. With the brake pedal in its rear spring held position, this brake is released, and is applied by pushing the pedal forward. With the reverse pedal in its rear spring held position, the reverse gear drive is disconnected, and to apply such connection, the pedal is pressed forward. With the clutch pedal in its rear spring held position, the gear connection is "in high". On a forward movement of this pedal, the clutch is first shifted to neutral position (disconnecting the drive from the motor), and on a further forward movement the connection is brought into "low".

With this mechanism, and with the gear in "high", it is necessary, in stopping the car, to use both feet, first pushing the clutch pedal forward to "neutral" and then applying pressure to the brake pedal. If this order is not observed, and the brake pedal is applied first, there is danger of injury to the gears, or the engine may be stalled. Also in case the machine is standing, and it is desired to back the car, it is necessary to hold the clutch pedal forward in neutral position with one foot, while the reverse pedal is pressed forward with the other foot.

The object of my invention is to provide an attachment of very cheap simple construction, readily applicable by any purchaser, to the type of car referred to, which will simplify the operation as above set forth, rendering it easier to learn to drive the car, and reducing the danger of injury to the car in operating the gear shifting devices and the service brake. In the use of my attachment, the requirement for using both feet at the same time to operate the pedals, under the two conditions as above set forth is avoided. The attachment provides for automatically shifting the clutch pedal from "high" to "neutral" when the service brake is applied, thus avoiding the danger of injury to the mechanism or of stalling the engine, and further provides for shifting the clutch pedal from "high" to "neutral" automatically when the reverse pedal is pushed forward to operative position. The attachment also preferably includes a lock arranged to automatically engage one of the parts, when the reverse pedal is applied, or when the reverse pedal is moved to reversing position, so that the operator is relieved of the effort incident to holding these pedals down against the tension of the springs, which normally hold the pedals in their rear positions. The lock is arranged so that it may be released by merely giving the clutch pedal a further forward movement from its neutral position.

The attachment is designed to do the same work as that of my Patent No. 1,480,543, but structurally is very different and has the advantages (1) that it requires less pressure at the end of its operation than at the start, thereby minimizing the back pressure of the clutch spring against the pedals and so insuring a firm application of the transmission bands to either the brake or reverse drums, (2) that it is beneath the floor of the car, and (3) that it is somewhat cheaper and simpler. One embodiment of the invention is illustrated in the accompanying drawings wherein:

Figures 1, 2, 3 and 4 are side elevations with the parts in four different positions of use; Fig. 1 showing the parts with the clutch pedal in high position, the brake pedal in release position and the reverse pedal in disconnected position; Fig. 2 showing the parts with the brake pedal in applied position, the clutch pedal in neutral position, and the reverse pedal in disconnected position; Fig. 3 showing the parts with the reverse pedal in connected position, the clutch pedal in neutral position, and the brake pedal in off position; and Fig. 4 showing the parts with the clutch pedal in low position, the brake pedal in release position, and the reverse pedal in disconnected position. And Fig. 5 is a partial plan view of the locking bar and latch.

Referring to the drawings, B is the brake pedal, mounted on the shaft 1 connected to the service brake. R is the reverse pedal mounted on the shaft 2 extending into the gear casing. And C is the clutch and gear shifting pedal mounted on the shaft 3 and having a crank 4, arranged to turn the clutch control shaft 5 through the intermediary of the clutch operating lever 6, keyed to the shaft, and the connecting rod 7. The free end of the lever 6 is provided with the usual bolt or screw 8 for cooperating with a cam member (not shown) carried by the emergency brake shaft 9. All this mechanism is regulation Ford equipment, well known to those skilled in the art, the parts being normally spring held in the position shown in Fig. 1.

The attachment, which is applied to this standard apparatus comprises the collars 10 and 11 bolted around the brake and clutch levers; the bell crank lever member 12 mounted so as to turn freely on the emergency brake shaft 9; the two connecting rods 13 and 14 pivoted at their upper ends to the collars 10 and 11, and having lost motion connections at their other ends with the pin 15 carried by the long arm or lever member 12; the collar 16 bolted around the upper end of the lever 6; the connecting rod 17 pivoted at its upper end to the collar 16, and having at its other end, a lost motion connection with the pin 18 carried by the short arm of the lever 12; the locking bar 19 pivotally mounted at one end to turn freely around the clutch controlling shaft 5; and the latch 20, pivoted on the pin 21, so that it can swing in a clockwise direction to the position indicated in Fig. 2, but held from swinging in the reverse direction from the position of Fig. 1 by a lip 22 which is bent laterally across the top of the bar 19.

The connecting rods 13, 14 and 17 are all similarly constructed for adjustment as to length and consist in each case of a rod carrying a pair of nuts, and extending through the laterally turned end of the strap section, slotted at its lower end to provide the lost motion connection with one of the pins on the bell crank 12.

The locking bar 19 constitutes a refinement, which may be applied as a part of the attachment (adding somewhat to the ease of operation), or which may be omitted from the attachment without seriously impairing its utility. To facilitate an understanding of the device, its operation will be first described with the locking bar left out of consideration, after which the function of the locking bar and its latch 22 will be readily seen.

Starting with the parts in the position of Fig. 1, the pedals are all spring held in the positions shown, and the clutch is in "high" and the brake is in release position. If now, it is desired to stop the machine, all that is necessary is to push the brake pedal forward to the position illustrated in Fig. 2. During the first part of this movement, the crank member 12 is not affected, because of the lost motion connection at the lower end of the rod 13, but before the brake is applied, the end of the slot in the lower end of this lever 13 engages the pin 15, and causes the rotation of the lever 12 in a counter clockwise direction. This causes the pin 18 to move the rod 17 to the left turning the lever 6 and the clutch shaft 5 also in a counter clockwise direction. This brings the clutch to "neutral" just before the brake is applied. The swinging of the lever 6, of course, moves the clutch pedal to the left from the position of Fig. 1 to that of Fig. 2. It is thus possible to perform the two functions of throwing the clutch to "neutral" and of applying the brake by the actuation of a single pedal, instead of requiring the application of both feet of the operator to the two pedals. When the operator's foot is removed from the brake pedal, the parts will, of themselves, return to the position of Fig. 1, and this is where the locking bar 9 comes into play to prevent this automatic return (as later explained) when it is desired to stop the machine for any length of time. During the forward movement of the brake pedal and clutch pedal, as above described, the reverse pedal remains unaffected because of the lost motion connection between the pin 15 and lever 14, which permits the pin to move forward without giving the reverse pedal a forward movement.

If now the brake pedal is allowed to return to off position, permitting the clutch pedal to return to "high", and it is desired to shift to "reverse", this is accomplished by merely pressing the reverse pedal forward, without the necessity of first pushing the clutch pedal to "neutral". The forward movement of the reverse pedal first moves the rod 14, so that the rear end of its slot engages the pin 15, after which a further movement causes the levers 12 and 6 to move to the positions of Fig. 3, thus turning the clutch shaft 5 to "neutral" (as described in the preceding paragraph). The final travel of the reverse pedal throws in the reverse clutch attached to the shaft 2, but this final travel of the reverse pedal causes no further movement of the clutch pedal (from "neutral"), since, at this time the pin 18 is moving substantially tangent to the circle about which the lever 17 is swinging with the pivot 23 as a center. Here again the locking bar 19 comes into play (as later described) to hold the parts in the position illustrated, and so relieve the operator of this effort. On releasing the reverse pedal, it returns to the position of Fig. 1 during which movement, the reverse gear is first released followed by the return of the clutch pedal from "neutral" to "high".

In shifting from the high gear position of Fig. 1, to the low gear position of Fig. 4, the clutch pedal is pushed forward first shifting the gear to "neutral" and then to "low", the other cooperating parts assuming at this time the positions indicated in Fig. 4. The lever 12 is not affected by this movement of the clutch pedal and the parts 6 and 17, since the slot in the rod 17 permits it to move to the left without moving the pin 18 carried by the lever 12.

As heretofore indicated, the locking bar 19 with its latch member 20, are designed to relieve the operator from the necessity of holding the clutch pedal forward in neutral position when the car is stopped, and also when changing from forward direction to reverse direction. This enables the driver to use his right foot for the operation of the brake only, leaving the left foot free to operate the clutch pedal or reverse pedal as it may be needed, thus making the driving safer and simpler. When the lever 12 turns from the position of Fig. 1 to that of Fig. 2, the pin 15 moves to the left, swinging the latch around its pivot 21 to the position of Fig. 2, and the bar 19 drops down over the pin, thus locking the clutch pedal in the neutral position of Fig. 2. When the driver releases the pressure of his foot on the brake pedal, it returns to release position, but the clutch pedal remains locked at neutral position. The operator is thus relieved of the necessity of keeping his foot pressed against the brake pedal while the machine is to be stopped, unless the machine happens to be stopped upon a grade.

In order to release the locking bar, the clutch pedal is first pushed forward slightly from "neutral" position, which movement causes the lever 6 to engage the pin 24 carried by the downwardly projecting arm 25 of the bar 19, thus tilting the right hand end of such bar upward, and disengaging the shoulder 26 (Fig. 4) on the bar from the pin 15. This permits the latch 20 to swing down, so that its lower side lies above the pin 15 in approximately the relation indicated in Fig. 4. The downward movement of the locking bar is made more positive by the use of a coil spring 27 attached at its upper end to the pin 28 on the latch, and at its lower end to the shaft 9 or to some part of the lever 12. On now releasing the clutch pedal, the locking bar no longer interferes with the return of such pedal to the positions of Fig. 1, since the latch rides on top of the pin 15, until the bar and latch arrive at the position of Fig. 1.

The functioning of the locking bar is similar to that just described when the reverse pedal is applied bringing the parts to the position of Fig. 3, the bar 19 dropping down to locking position, as illustrated, so that the operator is relieved of the effort of holding the clutch pedal forward in neutral position while the machine is being backed up. The release of the locking bar is accomplished as heretofore described by pushing the clutch pedal forward slightly from its neutral position to get the latch 20 back to its normal position, and then allowing such clutch pedal to move back to high position.

What I claim is:

1. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a clutch operating lever secured thereto intermediate its ends, and a connection between the lower end of such lever and the lower end of the clutch pedal, of an attachment comprising, a lever member pivoted behind the clutch control shaft adjacent thereto on an axis of rotation parallel thereto, a connection between such lever member and the brake pedal, and a second connection between such lever member and the upper end of said clutch operating lever, all so arranged that when the brake pedal is moved forward, the clutch operating shaft and the clutch pedal are first moved to neutral position, followed by an application of the brake on a further forward movement of the brake pedal.

2. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a clutch operating lever secured thereto intermediate its ends, and a connection between the lower end of such lever and the lower end of the clutch pedal, of an attachment comprising, a lever member pivoted behind the clutch control shaft adjacent thereto on an axis of rotation parallel thereto, a lost motion connection between such lever member and the brake pedal, and a second lost motion connection between such lever and the upper end of said clutch operating lever, all so arranged that when the brake pedal is moved forward, the clutch operating shaft and the clutch pedal are first moved to neutral position, followed by an application of the brake on a further forward movement of the brake pedal.

3. The combination with the gear shifting mechanism of an automobile, including a brake pedal normally spring held at rear position with the brake off, a clutch and gear shift pedal pivoted intermediate its ends and spring held at rear position with the gear in "high" and adapted in its next forward position to bring the clutch to release or neutral position, a clutch control shaft, a clutch operating lever secured thereto intermediate its ends, a connection between the lower end of such lever and the lower end of the clutch pedal, and an emerging brake shaft to the rear of the clutch control shaft, of an attachment comprising a lever member mounted for rotation on said emergency brake shaft, a connection between such lever member and the brake pedal, and a second connection between such lever member and the upper end of said clutch operating lever, all so arranged that when the brake pedal is moved forward, the clutch operating shaft and the clutch pedal are first moved to neutral position, followed by an application of the brake on a further forward movement of the brake pedal.

4. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a clutch operating lever secured thereto intermediate its ends, and a connection between the lower end of such lever and the lower end of the clutch pedal, of an attachment comprising, a lever member pivoted behind the clutch control shaft adjacent thereto on an axis of rotation parallel thereto, a connection between such lever member and the brake pedal, a second connection between such lever member and the upper end of said clutch operating lever, all so arranged that when the brake pedal is moved forward, the clutch operating shaft and the clutch pedal are first moved to neutral position followed by an application of the brake on a further forward movement of the brake pedal, a locking member arranged to automatically engage said lever member when it arrives at its forward position, and means operated by a forward movement of the clutch pedal from neutral position to release said locking member.

5. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a clutch operating lever secured thereto intermediate its ends, and a connection between the lower end of such lever and the lower end of the clutch pedal, of an attachment comprising, a lever member pivoted behind the clutch control shaft adjacent thereto on an axis of rotation parallel thereto, a connection between such lever member and the brake pedal, a second connection between such lever member and the upper end of said clutch operating lever, all so arranged that when the brake pedal is moved forward, the clutch operating shaft and the clutch pedal are first moved to neutral position followed by an application of the brake on a further forward movement of the brake pedal, a locking member pivoted on the clutch control shaft and having a shoulder arranged to engage said lever member and lock it when it arrives at its forward position, and means on the clutch operating lever for engaging the locking bar and moving it to release position when the clutch and gear shift pedal is moved forward from neutral position.

6. The combination with the gear shifting mechanism of an automobile, including a brake pedal normally spring held at rear position with the brake off, a clutch and gear shift pedal pivoted intermediate its ends and spring held at rear position with the gear in "high" and adapted in its next forward position to bring the clutch to release or neutral position, a clutch control shaft, a clutch operating lever secured thereto intermediate its ends, and a connection between the lower end of such lever and the lower end of the clutch pedal, of an attachment comprising, a lever member pivoted behind the clutch control shaft adjacent thereto on an axis of rotation parallel thereto, a connection between such lever member and the brake pedal, a second connection between such lever member and the upper end of said clutch operating lever, all so arranged that when the brake pedal is moved forward, the clutch operating shaft and the clutch pedal are first moved to neutral position followed by an application of the brake on a further forward movement of the brake pedal, a locking member pivoted on the clutch control shaft and having a shoulder arranged to engage said lever member and lock it when it arrives at its forward position, means on the clutch operating lever for engaging the locking bar and moving it to release position when the clutch pedal is moved forward from neutral position, and a latch mounted on the locking bar and adapted to prevent the re-engagement between the shoulder on the locking bar and the lever member as the lever member moves back to its starting position.

7. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a reverse pedal normally spring held in rear or neutral position and adapted on its forward movement to bring the gear into reverse position, a clutch control shaft, a clutch operating lever secured thereto intermediate its ends, and a connection between the lower end of such lever and the lower end of the clutch pedal, of an attachment comprising a lever member pivoted behind the clutch control shaft on an axis of rotation parallel thereto, and connections between such lever member and the brake pedal and reverse pedal, and also between such lever member and the upper end of said clutch operating lever, all so arranged that the clutch operating shaft and clutch pedal are moved to neutral position, either when the brake pedal is pushed forward to braking position, or when the reverse pedal is pushed forward to reversing position.

8. The combination with the gear shifting mechanism of an automobile, including a brake pedal normally spring held at rear position with the brake off, a clutch and gear shift pedal pivoted intermediate its ends and normally spring held at rear position with the gear in "high" and adapted in its next forward position to bring the clutch to release or neutral position, a clutch control shaft, a reverse pedal normally spring held in rear or neutral position and adapted on its forward movement to bring the gear into reverse position, a clutch control shaft, a clutch operating lever secured thereto intermediate its ends, and a connection between the lower end of such lever and the lower end of the clutch pedal, of an attachment comprising a lever member pivoted behind the clutch control shaft on an axis of rotation parallel thereto, lost motion connections between such lever member and the brake pedal and reverse pedal, and also between such lever member and the upper end of said clutch operating lever, all so arranged that the clutch operating shaft and clutch pedal are moved to neutral position, either when the brake pedal is pushed forward to braking position, or when the reverse pedal is pushed forward to reversing position.

9. The combination with the gear shifting mechanism of an automobile, including a brake pedal normally spring held at rear position with the brake off, a clutch and gear shift pedal pivoted intermediate its ends and normally spring held at rear position to bring the clutch to release or neutral position, a clutch control shaft, a reverse pedal normally spring held in rear or neutral position and adapted on its forward movement to bring the gear into reverse position, a clutch control shaft, a clutch operating lever secured thereto intermediate its ends, and a connection between the lower end of such lever and the lower end of the clutch pedal, of an attachment comprising a lever member pivoted behind the clutch control shaft on an axis of rotation parallel thereto, connections between such lever member and the brake pedal and reverse pedal, and also between such lever member and the brake pedal, all so arranged that the clutch operating shaft and clutch pedal are moved to neutral position, either when the brake pedal is pushed forward to braking position, or when the reverse pedal is pushed forward to reversing position, a locking member arranged to automatically engage said lever member when it arrives at its forward position, and means operated by a forward movement of the clutch pedal from neutral position to release said locking member.

10. The combination with the gear shifting mechanism of an automobile, including a clutch and gear shift pedal pivoted intermediate its ends and normally spring held at rear position with the gear in "high" and adapted in its next forward position to bring the clutch to neutral position, a clutch control shaft, a clutch operating lever secured thereto intermediate its ends, a connection between the lower end of the clutch pedal, and a reverse pedal normally spring held in rear or neutral position and adapted on its forward movement to bring the gear into reverse position, of an attachment comprising a lever member pivoted behind the clutch control shaft adjacent thereto on an axis of rotation parallel thereto, a connection between such lever member and the reverse pedal, and a second connection between such lever member and the upper end of said clutch operating lever, so arranged that the clutch operating shaft and clutch pedal are first moved to neutral position when the reverse pedal is moved to reverse position.

11. The combination with the gear shifting mechanism of an automobile, including a clutch and gear shift pedal pivoted intermediate its ends and normally spring held at rear position with the gear in "high", and adapted in its next forward position to bring the clutch to neutral position, a clutch control shaft, a clutch operating lever secured thereto intermediate its ends, a connection between the lower end of such lever and the lower end of the clutch pedal, and a reverse pedal normally spring held in rear or neutral position and adapted on its forward movement to bring the gear into reverse position, of an attachment comprising a lever member pivoted behind the clutch control shaft adjacent thereto on an axis of rotation parallel thereto, a lost motion connection between such lever member and the reverse pedal, and a second lost motion connection between such lever member and the upper end of said clutch operating lever, so arranged that the clutch operating shaft and clutch pedal are first moved to neutral position when the reverse pedal is moved to reverse position.

12. The combination with the gear shifting mechanism of an automobile, including a clutch and gear shift pedal pivoted intermediate its ends and normally spring held at rear position with the gear in "high," and adapted in its next forward position to bring the clutch to neutral position, a clutch control shaft, a clutch operating lever secured thereto intermediate its ends, a connection between the lower end of such lever and the lower end of the clutch pedal, and a reverse pedal normally spring held in rear or neutral position and adapted on its forward movement to bring the gear into reverse position, of an attachment comprising a lever member pivoted behind the clutch control shaft adjacent thereto on an axis of rotation parallel thereto, a connection between such lever member and the reverse pedal, a second connection between such lever member and the upper end of said clutch operating lever so arranged that the clutch operating shaft and clutch pedal are moved to neutral position when the reverse pedal is moved to reverse position, a locking member arranged to automatically engage said lever member when it arrives at its forward position, and means operated by a forward movement of the clutch pedal from neutral position to release said locking member.

In testimony whereof, I have hereunto subscribed my name this 21st day of Oct., 1924.

VACLAV CHUCHEL.